(12) United States Patent
Shen et al.

(10) Patent No.: US 10,278,333 B2
(45) Date of Patent: May 7, 2019

(54) PRUNING ROBOT SYSTEM

(71) Applicant: Institute of Automation Chinese Academy of Sciences, Beijing (CN)

(72) Inventors: Zhen Shen, Beijing (CN); Mengzhen Kang, Beijing (CN); Jiantong Li, Beijing (CN); Feiyue Wang, Beijing (CN)

(73) Assignee: Institute of Automation Chinese Academy of Sciences, Beijing (CN)

( * ) Notice: Subject to any disclaimer, the term of this patent is extended or adjusted under 35 U.S.C. 154(b) by 0 days.

(21) Appl. No.: 15/314,068

(22) PCT Filed: May 26, 2014

(86) PCT No.: PCT/CN2014/078432
§ 371 (c)(1),
(2) Date: Nov. 26, 2016

(87) PCT Pub. No.: WO2015/180021
PCT Pub. Date: Dec. 3, 2015

(65) Prior Publication Data
US 2017/0181383 A1    Jun. 29, 2017

(51) Int. Cl.
*A01G 3/08*    (2006.01)
*G01S 19/46*    (2010.01)
(Continued)

(52) U.S. Cl.
CPC .............. *A01G 3/08* (2013.01); *G01S 5/0263* (2013.01); *G01S 19/46* (2013.01); *G01S 19/48* (2013.01);
(Continued)

(58) Field of Classification Search
CPC ...................................................... A01G 3/08
See application file for complete search history.

(56) References Cited

U.S. PATENT DOCUMENTS

| | | | | |
|---|---|---|---|---|
| 7,854,108 | B2 * | 12/2010 | Koselka | A01D 46/30 56/10.2 A |
| 8,381,501 | B2 * | 2/2013 | Koselka | A01D 46/30 56/10.2 A |

(Continued)

FOREIGN PATENT DOCUMENTS

| | | |
|---|---|---|
| CN | 101126808 A | 2/2008 |
| CN | 102135766 A | 7/2011 |

(Continued)

OTHER PUBLICATIONS

PCT/CN2014/078432 International Search Report.

*Primary Examiner* — Hussein Elchanti
*Assistant Examiner* — Michael A Berns
(74) *Attorney, Agent, or Firm* — Howard IP Law, PLLC; Jeremy Howard

(57) ABSTRACT

A pruning robot system, which comprises: a signal tag device (2) for detecting and storing information of trees and crops and positioning information, and assisting positioning; a robot (1) comprising a central processing device (10) for storing and analyzing data information of each part of the robot (1) and issuing action instructions to each part of the robot (1), and a positioning and navigating device (11) for positioning and navigating the robot (1), and for planning a path and providing obstacle-avoiding navigation for the robot (1) according to an electronic map; a cloud platform terminal (3), which is in connection and communication with the central processing device (10) of the robot (1) and is used for storing data of trees and crops as well as detection data of the robot (1), and for planning a path for the robot (1) through computing and experimenting according to the information data; a map building device (4) for building a three-dimensional electronic map corresponding to the plantation through field-detection by the robot (1). The pruning (Continued)

robot system realizes positioning in the plantation, robot (1) path planning, pruning information collection and automatic pruning.

13 Claims, 1 Drawing Sheet

(51) Int. Cl.
    *G05D 1/00*     (2006.01)
    *G05D 1/02*     (2006.01)
    *G01S 19/48*     (2010.01)
    *G01S 5/02*     (2010.01)

(52) U.S. Cl.
    CPC ......... *G05D 1/0011* (2013.01); *G05D 1/0088* (2013.01); *G05D 1/028* (2013.01); *G05D 1/0261* (2013.01); *G05D 1/0274* (2013.01); *G05D 1/0278* (2013.01); *G05D 2201/0201* (2013.01)

(56) References Cited

U.S. PATENT DOCUMENTS

| | | | |
|---|---|---|---|
| 8,504,234 B2 * | 8/2013 | Anderson | A01G 1/00 701/24 |
| 9,420,748 B2 * | 8/2016 | Chan | A01G 3/08 |
| 9,861,038 B2 * | 1/2018 | Moore | A01D 46/24 |
| 2001/0036295 A1 * | 11/2001 | Hendrickson | G01J 3/2803 382/110 |
| 2006/0213167 A1 | 9/2006 | Koselka | |
| 2007/0219666 A1 * | 9/2007 | Filippov | B60T 7/22 700/245 |
| 2010/0106344 A1 * | 4/2010 | Edwards | E02F 9/205 701/2 |
| 2011/0022231 A1 * | 1/2011 | Walker | A01D 46/264 700/259 |
| 2013/0110341 A1 * | 5/2013 | Jones | A01C 21/00 701/23 |
| 2014/0168412 A1 * | 6/2014 | Shulman | H04N 7/18 348/89 |
| 2016/0150729 A1 * | 6/2016 | Moore | A01D 46/24 701/50 |
| 2017/0181383 A1 * | 6/2017 | Shen | A01G 3/08 |

FOREIGN PATENT DOCUMENTS

| | | |
|---|---|---|
| CN | 102657037 A | 9/2012 |
| CN | 103218637 A | 7/2013 |

\* cited by examiner

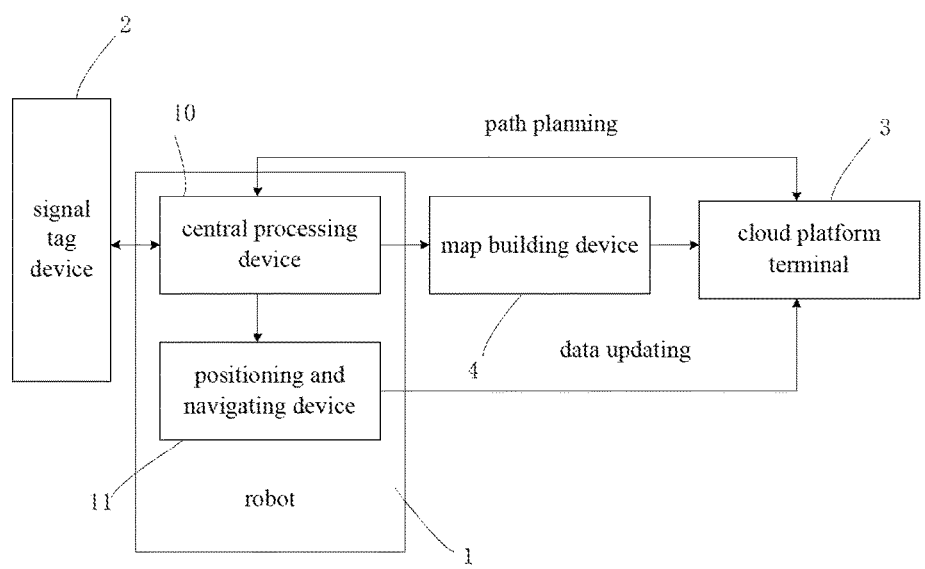

PRUNING ROBOT SYSTEM

TECHNICAL FIELD

The present invention relates to a pruning robot system, in particular to a pruning robot system based on RFID, GPS and WIFI positioning.

BACKGROUND OF THE INVENTION

The RFID technology, i.e. the radio frequency identification technology, is a communications technology that identifies a specific target and reads and writes data through radio signals without requiring the identification system to establish any mechanical or optical contact with the specific target. As a key technology in the field of IoT (Internet of Things), RFID is simple to use, efficient and safe, quick in response, large in storage space and so on. A complete RFID system consists of the three parts of a reader, an electronic tag and application software. The reader of the RFID may be used to write data that need to be stored into the RFID tag or to read data previously stored in the tag.

GPS, i.e. the Global Positioning System, realizes real-time positioning and navigation worldwide by means of positioning satellites. Users receive information of positioning satellites through a combination of the GPS receiver and satellite antenna so as to detect the position of the receiver. Civilian positioning accuracy is about 10 meters.

WIFI is a wireless network communication technology defined by IEEE and used for connecting such terminals as personal computers and handheld devices wirelessly to each other. By means of WIFI, users can realize wireless communication and wireless transmission, and can wirelessly locate WIFI signals through a base station.

The path planning technology is an important branch in the field of robot research, which is to find an optimal path from a starting location to a target location that can avoid obstacles based on one or some optimization criteria (such as the minimum working cost, the shortest walking route, the shortest walking time, etc.).

The cloud computing platform is an information platform formed by a series of dynamic resources and shared through the network. Users can access and use resources on the platform according to their own needs by way of renting, while they do not need to know the specific implementation technology. With the development of information technology, the cloud computing platform has been developed into a unitary service platform integrating such functions as storing, computing and software managing.

For economic trees and field crops, pruning is a necessary but tedious work. In a plantation of a large area, manual pruning is labor intensive and inefficient, besides. Since the plantation can be too large and workers may get too tired, missed pruning and repeated pruning usually occur, which will easily cause abnormalities in growth of trees and crops, leading to direct economic losses.

SUMMARY OF THE INVENTION

Aiming at the deficiencies of the prior art, the purpose of the present invention is to provide a pruning robot system to achieve positioning in the plantation, robot path planning, pruning information collection and automatic pruning.

To achieve the above object, the present invention provides a pruning robot system, which comprises:

a signal tag device, including RFID, GPS and WIFI, for detecting and storing information of trees and crops and positioning information, and for assisting positioning;

a robot, which comprises:
    a central processing device for storing and analyzing data information of each part of the robot and issuing action instructions to each part of the robot;
    a positioning and navigating device for positioning and navigating the robot by means of the RFID, GPS and WIFI, and for planning a path and providing obstacle-avoiding navigation for the robot according to an electronic map;
    a cloud platform terminal, which is in connection and communication with the central processing device of the robot and used for storing data of trees and crops as well as detection data of the robot, and for planning a path for the robot through computing and experimenting according to the information data;
    a map building device for building a three-dimensional electronic map corresponding to the plantation through field-detection by the robot.

Further, the system further comprises a manual control device including a manual control platform and an instruction receiver, wherein the manual control platform manually selects the automatic or semi-automatic operating mode of the robot and actions of the robot are controlled through the control platform when the robot is in a semi-automatic operating mode; the instruction receiver is on the robot, receiving instructions from the control platform and then controlling in accordance with the instructions.

Further, the robot further comprises a driving device connected to said central processing device and used for driving said robot to walk.

Further, the robot further comprises a pruning arm connected to the central processing device and having a sleeve-type structure, with pruning scissors at an end thereof.

Further, the robot further comprises a visual imaging monitoring device connected to the central processing device and including two cameras, a geographical environment detection sensor and an image processing module which are used for three-dimensional imaging during building of the map, road condition monitoring and image analysis during pruning.

Further, the robot further comprises a RFID reader connected to the central processing device for detecting RFID tags of trees and crops and reading data in the tags.

Further, the robot further comprises an obstacle avoidance module connected to the central processing device and including a plurality of distance measuring sensors and image sensors and used for avoiding obstacles during walking of the robot.

Further, the three-dimensional electronic map in the map building device is built based on the perceptual information of the robot.

Further, said building of the three-dimensional electronic map is to pair the scene graphs captured by the cameras of the robot and to record the height information with grids after calculating the heights thereof, then to draw a three-dimensional scene based on single-frame information, and to connect all data points into triangle meshes to reproduce the topology of the original three-dimensional surface.

The pruning robot system of the present invention realizes positioning in the plantation, robot path planning, pruning information collection and automatic pruning.

BRIEF DESCRIPTION OF THE DRAWING

FIG. 1 is a schematic drawing of the pruning robot according to the present invention.

DETAILED DESCRIPTION OF THE INVENTION

The technical solution of the present invention will be described in further detail below through the drawing and the embodiments.

The present invention proposes a pruning robot system based on RFID, GPS and WIFI positioning. Said system uses a robot to replace manual work for pruning, the robot marches in the plantation according to a planned path, and each object to be pruned is positioned through RFID, GPS and WIFI, thus realizing accurate positioning, and after positioning, the robot automatically prunes trees and crops without any missed pruning and repeated pruning. In this case, the present invention can save the labor costs of the plantation, improve work efficiency, and avoid unnecessary economic losses.

The present invention relates to application of the computer technology and electronic information technology to such aspects as automatic or semi-automatic pruning and positioning of a pruning robot in a plantation, and it uses such technologies as RFID, GPS, WIFI, path planning technology and cloud computing technology to provide technical support for pruning of trees in a plantation or field crops and for positioning of the pruning robot.

FIG. 1 is a schematic drawing of the pruning robot of the present invention. As shown in the FIGURE, the present invention specifically comprises a robot 1, a signal tag device 2, a cloud platform terminal 3 and a map building device 4. Further, the robot 1 comprises a central processing device 10 and a positioning and navigating device 11.

The signal tag device 2 includes RFID, GPS and WIFI for detecting and storing information of trees and crops and positioning information, and for assisting positioning.

Specifically, the signal tag device 2 contains an RFID chip, a GPS and WIFI chip for storing information of trees and crops and positioning information, and for assisting positioning.

The central processing device 10 of the robot 1 is for storing and analyzing data information of each part of the robot and issuing action instructions to each part of the robot; the positioning and navigating device 11 is for positioning and navigating the robot using the RFID, GPS and WIFI, and providing path planning and obstacle avoidance navigation for the robot according to the electronic map.

The cloud platform terminal 3 is connected to and communicates with the central processing device 10 of the robot 1 for storing data of trees and crops as well as detection data of the robot, and for planning a path for the robot through computing and experimenting according to the information data.

Specifically, the cloud platform terminal 3 can store data of trees and crops as well as detection data of the robot, connect the central processing module configured on the robot and communicate therewith, and plan a path for the robot through computing and experimenting according to the relevant information data.

The map building device 4 is for building a three-dimensional electronic map corresponding to the plantation according to field detection of the robot.

Detailed descriptions of the pruning robot are as follows:

A driving device, connected to the central processing device, and in order to ensure stability and safety of walking of the robot in the plantation, a six-legged walking structure is used as the driving device for the robot.

A body, which is the main support architecture of the robot and is made of alloy materials, comprises a body platform, a camera support frame and an arm support bracket, and a light is installed on the body to ensure that the robot can still work normally in a dark environment.

A pruning arm, connected to the central processing device and having a sleeve-type structure, which is made of high-strength materials and has a special pruning scissors provided at an end thereof.

A visual imaging monitoring device, connected to the central processing device and comprising two cameras capable of 360-degree rotation disposed in front of the robot body, a geographical environment detection sensor and an image processing module, which are used for road condition monitoring, three-dimensional imaging during map building and image analysis during pruning.

A RFID reader, connected to the central processing device for detecting RFID tags of trees and crops and reading data in the tags.

An instruction receiver, connected to the central processing device, for receiving instructions from the manual control platform.

A positioning and navigating device, connected to the central processing device for positioning when the robot is mapping and pruning and for realizing positioning and navigation functions by means of GPS and WIFI.

An obstacle avoidance module, connected to the central processing device for avoiding obstacles when the robot is walking, and it includes distance measuring sensors and at least one image sensor.

A central processing device, located at the body of the robot, connected to the parts of the robot, storing and analyzing data information of each part, communicating with the cloud platform and issuing action instructions to each part of the robot.

The pruning robot system of the present invention may further comprise a manual control device, including a manual control platform and an instruction receiver, wherein the manual control platform manually selects the automatic or semi-automatic operating mode of the robot artificially and controls actions of the robot through the control platform when the robot is in the semi-automatic operating mode; the instruction receiver is on the robot for receiving instructions from the control platform, and then conducts controlling in accordance with the instructions.

Specifically, the manual control platform can artificially select the automatic or semi-automatic operating mode of the robot, and when the robot is in the semi-automatic operating mode, an operator can control the robot, through the control platform, to perform a series of actions such as moving, photographing, monitoring and pruning, and the operation instructions of the operator are sent through the control platform. The instruction receiver is located on the robot, which can receive instructions from the control platform and perform the corresponding actions according to the instructions. Signal transmission between the control platform and the receiver can be realized by means of 3G or WIFI network or other wireless communication technology.

In order to realize operation of the pruning robot system, the corresponding software implementations are as follows:

A cloud platform terminal management system for performing unified management of data information and performing complex computations and experiments.

A central processing system of the central processing device for the entire robot's starting, running, and data recording, storing and analyzing.

A RFID device reading and writing program for reading data in the tags using the RFID reader and for rewriting data information into the tags.

An arm control program for controlling the arm to perform precise pruning actions.

A robot drive program for controlling the driving device of the robot to enable the robot to walk.

An image analyzing and pruning system, which comprises an image analyzing module and a pruning module. The image analyzing module converts images collected by the cameras into grayscale images, and performs such preprocessing operations as filtering, threshold segmenting, morphological closing operation, etc. to obtain images which provide data support for subsequent road condition analysis and pruning positioning. The pruning module extracts branch skeleton images from the images by means of a parallel or serial algorithm, and then detects buds in the branch skeleton images using Harris operators, and positions pruning points to prune according to the bud information.

There are many other algorithms to realize pruning, while the present invention only proposes one feasible option.

A manual control system is used for obtaining various data information recorded by the robot and for generating corresponding instructions of moving, photographing, monitoring, pruning, etc., and then for transmitting the instructions to the robot through a wireless network.

A positioning and navigating system for positioning and navigating the robot by means of RFID, GPS and WIFI, and providing path planning and obstacle avoidance navigation for the robot according to the electronic map.

A GPS and WIFI chip (wherein the WIFI chip may be mini chips like SDIOMT5931, RTL8188CE, etc. so as not to influence the growth of the trees or crops by the size of the chip) is provided on each tree or crop, which can serve as a WIFI hotspot to send out WIFI signals. The MAC address of each chip is unique and known and is pre-stored in the cloud platform management system. The robot searches for WIFI signals nearby through the positioning and navigating device during its marching, and according to the signal strength and the unique MAC address, the cloud platform management system queries the coordinate record of said signals to use it in combination with the satellite navigation coordinate record of the GPS for positioning and navigating the robot. This can achieve more precise positioning than using only the GPS technology or the WIFI technology.

When the robot is traversing the plantation to build the map, it determines and records, by the method described above, the coordinate position of each pruning object and stores the record in the RFID tags.

A map building system for building a three-dimensional electronic map corresponding to the plantation through field detection by the robot, and the program can be run on a cloud platform.

The three-dimensional map can be built based on perceptual information of the robot, and the process is briefly described herein as follows: First the scene graphs captured by the left and right cameras are paired, and the height information is recorded by grids after calculating the height. Then, a three-dimensional scene is drawn based on information of a single frame, and the three-dimensional scene is mainly drawn by using the OpenGL graphics library. Data of the measured height is equivalent to the given three-dimensional coordinates of points on the surface of the three-dimensional scene, and all the data points are connected to form a triangle mesh by using the triangulation algorithm in OpenGL, thereby well reproducing the topology of the original three-dimensional surface. At the same time, the present invention uses the pseudo-color technology and normal vectors in the technical field of simulation to lay a foundation for building of the map through grey level transformation and intensity stratification. The principle of pseudo-color enhancement is to map different grey levels of discrete black-and-white images into different colors linearly or non-linearly so as to increase the identifiable degree of the image. Here is a specific approach: divide the grey levels of the image into in sections with equal or unequal intervals; then set a color for each section, wherein, in principle, more divided hierarchies means richer details and softer colors; finally, the three-dimensional map is built, wherein coordinate systems including global coordinate system and local coordinate system of the robot are defined first, and the grid area under the coordinate system of the robot is introduced, then the map is represented through a grid representation method, and a precise real three-dimensional map is built at last by moving local grids.

With respect to the traversing, the present invention uses a segmentation algorithm. The segmentation algorithm refers to decomposing the environment into a plurality of segments according to the obstacles, and then the robot moves back and forth in the segments respectively to locally traverse each segment.

The present invention enables the robot to traverse the plantation and the pruning objects by means of map building in combination with the traversal algorithm, namely, while the robot is traversing the plantation, a map of the entire plantation is built according to the above-described map building method and coordinates of each of the pruning points and obstacles are recorded. The purpose of traversing by the robot is to make the robot walk all over an area except positions of the obstacles and to record at the same time the geographical environment, the positions of obstacles and pruning objects in the plantation.

The traversal algorithm of the present invention is as follows. First, the boundary of the plantation is manually measured using a rangefinder, then a rectangular boundary containing the entire plantation is established according to two longest axes of the plantation boundary which are mutually perpendicular, so that the traversing can follow a rectangle regardless of whether the plantation boundary is regular or not. After the establishment of the rectangle boundary, one vertex of the rectangle is used as the coordinate origin, i.e. the starting point of the robot, and the two edges of the rectangle at the starting point are the X-axis and the Y-axis, and coordinates of the rectangular boundary are calculated according to the coordinate origin so as to specify the range of walking of the robot. The coordinate origin as well as the coordinates of the rectangular boundary is stored in the central processing system of the robot. The robot moves firstly from the origin along the direction of the X-axis, while recording the environment data and calculating coordinates of the positions passed by the robot. If the robot finds any obstacle in the process of moving, then it moves in the direction of the Y-axis by one vehicle distance until bypassing the obstacle while recording the coordinates of the obstacle. The robot detects the pruning objects having RFID tags through the RFID reader during movement, and each time it detects an objects, it records the RFID data in the tag and the coordinates of the object in the plantation. When the robot moves to the rectangular boundary, it moves by one vehicle distance along the Y-axis increasing direction and returns along the direction opposite to the previous moving direction; by repeating this process, the robot can record the geographical locations of the obstacles, the pruning objects and the plantation terrain during movement; besides, the cover-type traversing of the robot by a vehicle distance ensures that there is no repetition or missing in the recorded data.

On the basis of the map building, the start point and end point of the robot, the work points (i.e. WIFI hotspots) that the robot must pass, and the positions of large static obstacles are recorded at the same time. The coordinates of each of the position points as well as the map are stored in the cloud platform with the management system, and the built map is also stored in the central processing system of the robot so as to prepare for later path planning.

A path planning system is used for planning a pruning path for the robot by means of intelligent algorithms as well as the recorded plantation map and coordinate data.

As far as the path planning technology used for the robot is concerned, a grid method is used in the present invention. In the grid method, the space around the robot is decomposed into interconnected spatial units, i.e. grids, that do not overlap, and a connected graph is formed by the grids, and then this graph is searched for a collision-free path from the starting grid to the target grid.

The present invention uses the map building and path planning technology, which, based on the pre-built three-dimensional electronic map, decomposes the space around the robot by means of the grid method to avoid the already detected obstacles and plan a path based on the pre-set map and the work points that must be passed through. The path can be identified by an optimization algorithm for all points that must be passed through, and the fitted path not only includes the work points that must be passed through, but also excludes the fixed obstacles detected during the traversal, namely, the robot is forbidden to walk to the coordinates of the obstacles. The path is stored in the central processing system of the robot, which enables the robot to proceed in accordance with the planned path.

A robot obstacle avoidance system is used for helping the robot to automatically or semi-automatically avoid unexpected obstacles during walking using intelligent algorithms and sensors, so that the robot can smoothly walk from one point that must be passed through to another point that must be passed through according to the planned path.

Since the plantation is an open environment and the environmental factors therein are not steady, when the robot walks according to the pre-planned path, unexpected and undetected obstacles may appear, so it is necessary to use this obstacle avoidance system. The obstacle avoidance system uses infrared distance sensors in combination with visual ranging to realize obstacle avoidance for the robot. The infrared distance sensor is based on the principle of triangulation, and the sensor emits infrared light and receives light reflected back to obtain the offset values, and then calculates, by means of the triangle relation, the distance from the sensor to the object using the emission angle, the offset value, the central moment and the filter length. As for visual image ranging, the present invention uses an algorithm for real-time detection of the distance between a monocular vision computing robot and an obstacle. The basic principle of the algorithm is to calculate the distance between a target point and the robot based on the known camera position coordinates, vertical distance from the ground to the camera, minimum distance of the projection of the vertical angle of view of the camera on the ground and infrared distance sensor distance of the projection of the horizontal angle of view on the ground at the time, and maximum distance of the projection of the vertical angle of view of the camera on the ground.

Multiple infrared distance sensors and at least one image sensor are installed on the body of the robot, when there are no obstacle in the walking path of the robot, the robot moves according to the pre-planned path, but if an obstacle is detected, the robot calculates and determines the position information of the obstacle according to the detected real-time information, and then observes edge points of the obstacle in a horizontal direction to obtain the left and right boundaries, and then calculates the distances from the two boundaries to the perpendicular bisector and compares the two distances to determine from which side it should move round the obstacle and how far it should move round. After moving round the obstacle, the robot returns to its original path.

In the present invention, before arriving at a certain target object to prune, the robot temporarily considers other objects as obstacles, and it moves round other objects on the planned path during marching, and after pruning the target object, the robot takes the next pruning object as the target to continue moving according to the path.

The processing of the pruning robot system according to the present invention specifically includes:

Step 1: provide signal tags for trees and crops, record their basic data information and GPS and WIFI positioning information, and transmit the information to the cloud platform for a unified management.

Step 2: determine a starting point for movement of the robot in the plantation as the origin of the map. The robot starts from the origin to traverse all positions in the plantation, and it captures the geographical environment information of the entire plantation through sensors, cameras and positioning and navigating device. During the traversing, the robot also uses GPS and WIFI to detect coordinates of the pruning objects and detects the signal tags of the trees and crops using the RFID reader, and records data information thereof.

Step 3: transmit all geographical environment information and coordinate information to the cloud platform, which draws the three-dimensional electronic map of the plantation and the walking path of the robot for pruning according to the map building program and path planning algorithm, the path including all objects and explicitly specifying the sequence of pruning.

Step 4: transplant the map and path on the cloud platform to the central processing system of the robot to plan the path, then the robot sets out according to the planned path to prune the trees and crops.

Step 5: detect nearby RFID tags by the reader when the robot is marching, and if an RFID tag is detected, the reader reads data thereof.

Step 6: read coordinate data in the tag, if said data are consistent with the coordinates on the planned path, the object corresponding to said tag is a tree or crop complying with the sequence of the path, then reading data in said tag concerning whether the tree has been pruned or not; if the coordinates are not consistent, returning to step 6 to detect other RFID tags.

Step 7: if the object has been pruned, returning to step 6 and continuing moving along the path to detect the next object; if the object has not been pruned, the robot detects, by the cameras, the positions of the tree that need pruning and drives the arm to prune. After pruning, the robot updates data in the signal tag of the object to show that the tree has been pruned already, then the robot continues to detect the next object.

Step 8: if the robot has finished the whole path, it returns to the starting point and the pruning task ends.

In the case where multiple robots work simultaneously, different robots may traverse the plantation from different starting points, and the cloud platform uses different path planning algorithms to plan different pruning paths for different robots according to information collected by the robots, thereby improving pruning efficiency. If a robot detects other robots nearby, it may consider them as dynamic obstacles to avoid.

When performing dynamic obstacle avoidance, a hybrid obstacle avoidance algorithm may be employed, which predicts the movement track of the obstacle at the next moment according to three time-sequence values of adjacent time instants of the dynamic obstacle, thus transforming the problem of avoiding dynamic obstacles into the problem of avoiding static obstacles and realizing avoidance processing. Meanwhile, distance sensors may be used for sensing collision between robots and collision between robots and obstacles.

The pruning robot system of the present invention uses RFID and positioning equipment to help the robot to detect and position the trees or crops that need to be pruned, so it improves the accuracy and efficiency of work on the basis of automated operations. The robot of the present invention also can be an unmanned plane. Meanwhile, the present invention has universal adaptability, by means of intelligent algorithms and devices, the present invention can be applied to different terrains, plantations of different areas, and the efficient way of traversing also ensures that the robot has no redundant or missed work.

Those skilled in the art should be able to further realize that the components and algorithm steps of each example described in conjunction with the embodiments disclosed herein can be implemented by electronic hardware, computer software or a combination thereof. In order to illustrate interchangeability of hardware and software, the construction and steps of each example have been generally described in terms of the functions. As for whether said functions are achieved by hardware or software, it depends on the specific application and restrictions of design of the technical solution. Those skilled in the art can use a different method for each specific application so as to achieve the described functions, but such implementation shall not be considered as going beyond the scope of the present invention.

The steps of method or algorithm described in conjunction with the embodiment disclosed herein can be carried out by hardware, software modules executed by a processor or by a combination thereof. The software modules can be disposed in a random access memory (RAM), a memory, a read-only memory (ROM), an electrically-programmable ROM, an electrically erasable programmable ROM, a register, a hard disc, a removable disc, a CD-ROM or any other form of storage medium known in the art.

The above-described specific embodiment describes in detail the object, technical solution and advantageous effect of the present invention. But it shall be appreciated that all the above described are merely specific embodiments of the present invention, which do not intend to limit the protection scope of the invention. Any modification, equivalent substitution and improvement made under the spirit and principle of the present invention shall fall within the protection scope of the present invention.

What is claimed is:

1. A pruning robot system, characterized in that said system comprises:

a signal tag means, including RFID, GPS and WIFI, for detecting and storing information of trees and crops and positioning information, and for assisting positioning;

a robot, which comprises: a central processing means, for storing and analyzing data information of each part of the robot and issuing action instructions to each part of the robot;

a positioning and navigating means for positioning and navigating the robot by use of the RFID, GPS and WIFI, and for planning a path and providing obstacle-avoiding navigation for the robot according to an electronic map;

a cloud platform and terminal, which is in connection and communication with the central processing means of the robot and is used for storing information data including data of trees and crops as well as detection data of the robot, and for planning a path for the robot through computing and experimenting according to the information data;

a map building means for building a three-dimensional electronic map corresponding to a plantation through field-detection by the robot, said robot further comprises a RFID reader connected to the central processing device for detecting RFID tags of trees and crops and reading data in the tags, wherein, if coordinate data within an RFID tag detected by the RFID reader matches with the path of the robot determined by the cloud platform, then the signal tag means reads data on the RFID tag to determine if pruning has occurred.

2. The system according to claim 1, characterized in that said system further comprises a manual control means, including a manual control platform and an instruction receiver, wherein the manual control platform manually selects an automatic or a semi-automatic operating mode of the robot and actions of the robot are controlled through the manual control platform when the robot is in a semi-automatic operating mode; the instruction receiver is on the robot, receiving instructions from the control platform, and then controlling in accordance with the instructions.

3. The system according to claim 1, characterized in that said robot further comprises a driving means connected to said central processing means for driving said robot to walk.

4. The system according to claim 1, characterized in that said robot further comprises a pruning arm connected to the central processing means and having a sleeve-type structure, with a pruning scissors at an end thereof.

5. The system according to claim 1, characterized in that said robot further comprises a visual imaging monitoring means connected to the central processing means and including two cameras, a geographical environment detection sensor and an image processing means which are used for three-dimensional imaging during building of the map, road condition monitoring and image analysis during pruning.

6. The system according to claim 5, characterized in that said building of the three-dimensional electronic map includes pairing scene graphs captured by the two cameras and recording height information with grids after calculating the heights of the scene graphs, then generating a three-dimensional scene based on single-frame information, and connecting data points into triangle meshes to produce a topology of a portion of the plantation.

7. The system according to claim 1, characterized in that said robot further comprises an obstacle avoidance means connected to the central processing means and including a plurality of distance measuring sensors and image sensors for avoiding obstacles during walking of the robot.

8. The system according to claim 1, characterized in that the three-dimensional electronic map in the map building means is built based on a perceptual information of the robot.

9. The system according to claim 1, wherein the map building means is disposed remotely from the robot.

10. The system according to claim 1, wherein the map building means builds a map at least partially based on pseudo-color enhancement of captured images of the plantation.

11. The system according to claim 1, wherein the cloud platform includes the map building means.

12. The system according to claim 1, wherein the RFID reader is configured so as to update data in the RFID tag to indicate if pruning has been performed by the robot.

13. The system according to claim 1, further comprising a plurality of the robot,
   wherein the cloud platform and terminal calculates a path for each of the plurality of robots.

\* \* \* \* \*